United States Patent [19]

Momiyama et al.

[11] Patent Number: 4,544,256

[45] Date of Patent: Oct. 1, 1985

[54] SINGLE LENS REFLEX CAMERA WITH LIGHT MEASURING DEVICE

[75] Inventors: Kikuo Momiyama; Kazuo Fujibayashi, both of Kanagawa, Japan

[73] Assignee: Canon Kabushiki Kaisha, Tokyo, Japan

[21] Appl. No.: 648,704

[22] Filed: Sep. 7, 1984

[51] Int. Cl.$^4$ ............................................. G03B 7/099
[52] U.S. Cl. ................................. 354/429; 354/478; 354/481
[58] Field of Search .............. 354/429, 430, 434, 478, 354/481, 155, 219, 224, 225

[56] References Cited

U.S. PATENT DOCUMENTS 3,450,016  6/1969  Yamada ........................... 354/478 X
4,309,093  1/1982  Kuwayama et al. ................ 354/478

Primary Examiner—William B. Perkey
Attorney, Agent, or Firm—Toren, McGeady, Stanger, Goldberg & Kiel

[57] ABSTRACT

In the single lens reflex camera including a photographic system having an objective lens and an image detector, and a viewfinder optically disposed of the photographic system and comprising a focusing screen having a transparent area surrounded by a light diffusing area, a prism for changing the direction of an optical path, and an eye-piece in sequence from the object, a light receiving element for light measuring is positioned away from an optical axis of the viewfinder in rear of an image forming lens for converging the light from the focusing screen to the light receiving element, and is provided with a mask for blocking the main part of an image of the transparent area which is formed by the image forming lens, thereby the proportionality between the variation of F-number of the objective lens and the amount of light measured is improved.

9 Claims, 11 Drawing Figures

SINGLE LENS REFLEX CAMERA WITH LIGHT MEASURING DEVICE

BACKGROUND OF THE INVENTION

1. Field of the Invention

This invention relates to light measuring devices for single lens reflex cameras, and more particularly to light measuring devices of the type in which light from the focusing screen is received through the optical path bending prism arranged in the viewfinder.

2. Description of the Prior Art

The light measuring has been performed by putting an image forming lens and a light receiving element behind the exit face of the penta dach prism. The conventional light measuring devices of this kind have features that the structure is simple, and the space the light measuring device occupies is relatively readily available. But, because the image forming lens (collection lens) must be positioned away from the optical axis of the finder so as not to mutilate the path of light to an eye observing the finder, there was a drawback that the relationship of the F-number of the objective lens and the amount of light measured, or the so-called F-number proportionality was not good.

This reason is next explained by using drawings. FIG. 1 schematically illustrates the single lens reflex camera having the conventional light measuring device of this kind, where a focusing screen 1, a pentagonal roof type prism 2, an image forming lens 3, a light receiving element 4, an eye-piece 5, a photographic lens 6 having a diaphragm therein, a rotatable mirror 7 and a photographic film 8 are included.

FIG. 2 is an expanded view illustrating an optical path to the light measuring device and another optical path to the eye-piece, where O denotes the optical axis of the finder, K the oblique pencil of rays to the eye-piece, and M the optical path from the central portion of the area of the focusing screen to the light measuring device. The other reference characters denote the similar parts to those shown in FIG. 1. The pentagonal roof type prism 2 is depicted as expanded along the optical path. As is obvious in this drawing, the image forming lens 3 and the light receiving element 4 must be arranged at a considerably far position from the optical axis O of the finder in order to insure that the optical path K to the eye-piece of the finder is not mutilated at all. As the diaphragm stops down, therefore, that part of the light from the objective lens 6 which is shown by hatching does not arrive at the light receiving element 4. This gives rise to a problem that for dark F-numbers, the amount of light measured largely deviates from the proportion to the F-number of the photographic lens 6, as shown in FIG. 3.

In the graph of FIG. 3, the abscissa is in the F-number of the objective lens 6 and the ordinate is in the number of steps E of the measured light amount with reference to that when F/1.4 (where $E = \log_2 Q' - \log_2 Q$ wherein Q is the measured light amount at F/1.4 and Q' is the measured light amount at any other value of the F-numer). A straight line labelled I represents that the measured light amount is strictly proportional to the F-number, or the ideal F-number proportionality. The conventional light measuring device has an F-number proportionality shown by curve R. As has been stated above, it is in dark F-numbers that the F-number and the measured light amount become unproportional to each other. For note, the cause of breaking the F-number proportionality even at the brightest ones of the F-numbers is that the aperture opening of the light measuring optical system cannot be made sufficiently large, so that the light at the bright F-number does not fully enter the light receiving element 4. This problem is solved usually by using a signal pin on the photographic lens mounting in sensing the F-number at the full open aperture of the photographic lens 6 for the purpose of correcting the measured light amount.

Though the conventional light measuring devices of this kind have the above-described problem, it is actually due to the diffusing action of the matted surface D of the focusing screen as shown in FIG. 4 that even for the dark F-numbers, the diffusing light is allowed to enter the light receiving element 4 through the image forming lens 3, thus moderating the above-described problem. However, the generally accepted focusing screens 1 have a range finder area S at the center thereof in the form of split prisms as shown in FIG. 5. Because this range finder area is transparent, if the light measuring is carried out by the light only from this area, the above-described problem is intensified. That is, as the light measuring area narrows, when the ratio of the range finder to the light measuring area approaches unity, the F-number proportionarity is deteriorated badly.

For this reason, the use of a partial field of view light measuring mode or spot measuring mode worsens the F-number proportionality. As a result, when the diaphragm of the photographic lens 6 stops down, it becomes impossible to perform accurate light measuring. Also when the photographic lens 6 is interchanged, the amount of light measured must be corrected. Further in the camera of which the focusing screen is interchangeable, another problem is produced that the correction of the measured light amount depends on the form of the range finding area S. Also, in the light measuring device operating with selection of light measuring areas of different size, as the size of the light measuring area changes, another problem arises that the F-number proportionality becomes uncertain.

SUMMARY OF THE INVENTION

A first object of the present invention is to provide a light measuring device for a single lens reflex camera in which despite the F-number of the photographic system changes, the light measuring is performed in proportion thereto.

A second object is to assure that even when the light measuring area is narrow, the light measuring is performed with high accuracy, and also even when the light measuring area is changed over between the wide and narrow ones, the accurate light measuring is preserved.

A third object is to stabilize the accurate light measuring against the variation of the size of aperture opening of the photographic lens or against the interchange between the photographic lenses of different F-number at the full open aperture.

A fourth object is to assure the accuracy of light measuring even when the focusing screen is interchanged.

A fifth object is to provide a light measuring device of which an image forming lens and a light receiving element are arranged behind the exit face of the pentagonal roof type prism to measure light from an image of an object to be photographed formed on the focusing screen by the photographic lens, wherein the image forming lens is arranged so that light from the object image on the screen is almost sharply focused on the light receiving surface of the element, whereby that light portion which radiates from the central transparent area of the focusing screen is shut off either as a whole or in part at the light receiving surface.

DETAILED DESCRIPTION OF THE PREFERRED EMBODIMENTS

The present invention is next described in great detail by reference to the drawings.

Figure 1:
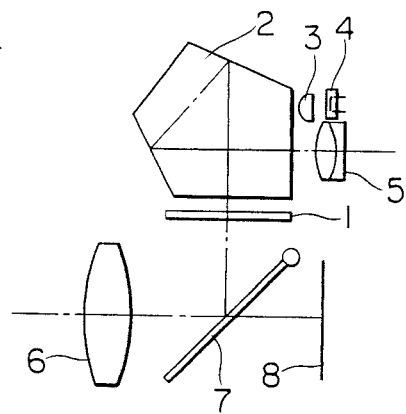
FIG. 1 is a schematic sectional view of the optical arrangement in the single lens reflex camera known in the art.
Figure 2:
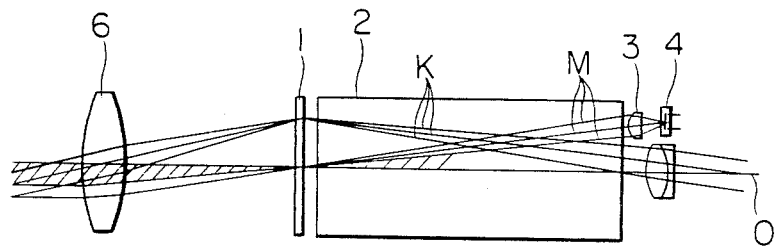
FIG. 2 is an expanded view of the light measuring optical system of the camera of FIG. 1.
Figure 3:
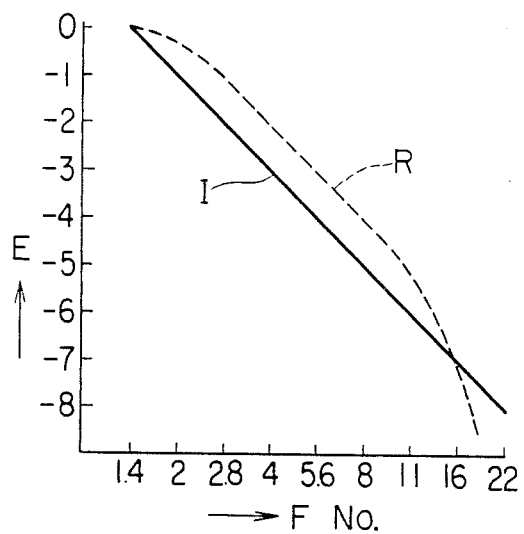
FIG. 3 is a graph of the F-number proportionality of the conventional light measuring device.
Figure 4:
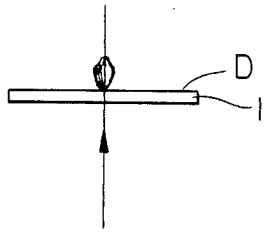
FIG. 4 is a side elevational view illustrating the diffusing characteristic of the focusing screen.
Figure 5:
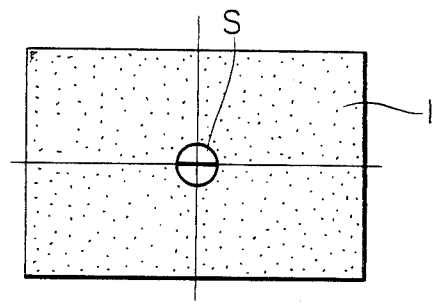
FIG. 5 is a plan view of the focusing screen having a range finder area mark.
Figure 6:
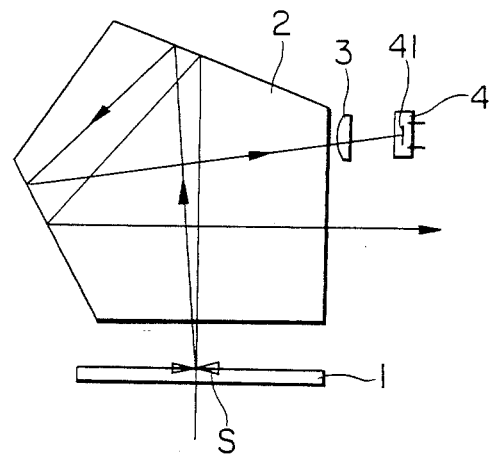
FIG. 6 is a sectional view of an embodiment of the light measuring device according to the present invention.
Figure 7:
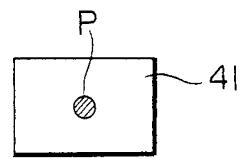
FIG. 7 is a plan view of the light receiving surface of the photosensitive element of FIG. 6.
Figure 8:
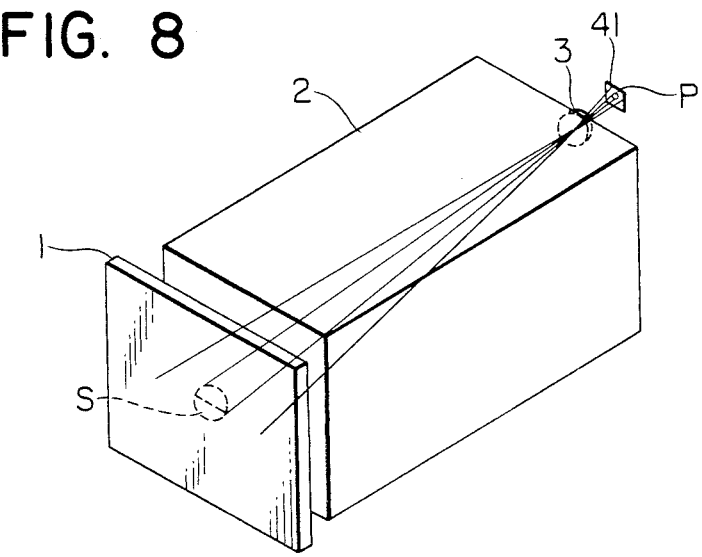
FIG. 8 is an expanded perspective view of the light measuring optical system of FIG. 6.
Figure 9:
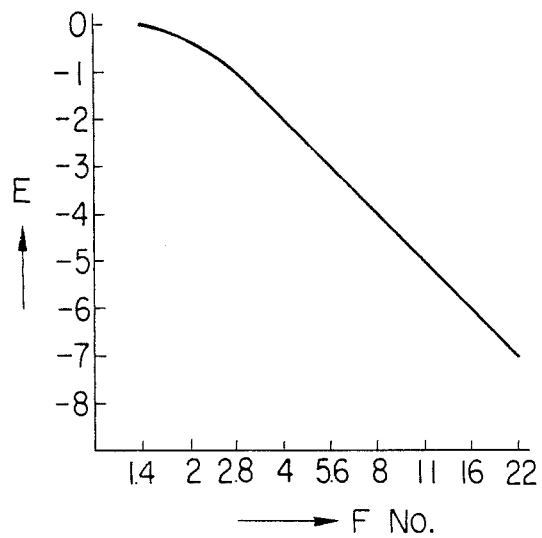
FIG. 9 is a graph of the F-number proportionality of the invention.

FIG. 6 illustrates the outline of an optical system in the light measuring device of the present invention. In this drawing, 1 is a focusing screen; S is a range finder area of the focusing screen 1; 2 is a pentagonal roof type prism; 3 is an image forming lens; 4 is a photosensitive element. The illustration of an eye-piece 5, a photographic lens 6, a rotatable mirror 7 and a photographic film is omitted. FIG. 7 illustrates how to form the light receiving surface 41 of the photosensitive element 4 of FIG. 6. A central round area P of the light receiving surface 41 is covered with an aluminium layer by vacuum deposition techniques to shut off light. Instead of using such aluminium layer, the light receiving surface itself may be otherwise formed to a circular zonal shape. FIG. 8 is an expanded view along an optical path illustrating how the light measuring optical system of FIG. 6 focuses light from the focusing screen 1 onto the light receiving surface 41. As will be understood from this drawing also, in the present embodiment, the image forming lens 3 is arranged to focus light from the object image on the focusing screen 1 almost sharply at the light receiving surface 41 of the photosensitive element, and the size of the range finder area S is near coincidence with that of the opaque area P. Because the light from the central transparent area (range finder area S) is shut off, the F-number proportionality is so improved as shown in FIG. 9. The size of the opaque portion P may be adjusted to shut out the overall range finder area S, or may be otherwise adjusted to shut out only part of the area S so that the photosensitive element 4 is somewhat responsive to the range finder area S. Also, the opaque portion P may be otherwise constructed in the form of a light shielding member ahead the light receiving surface 41, or in a semi-transparent form.

Figure 10:
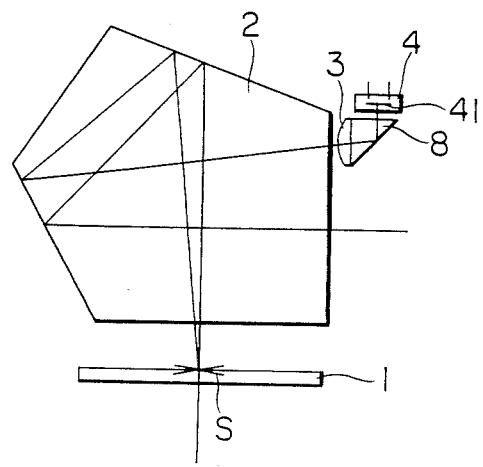
FIG. 10 is a sectional view of another embodiment of the invention.
Figure 11:
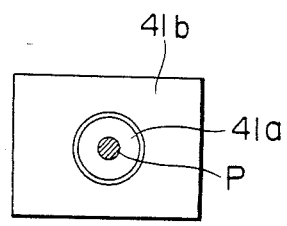
FIG. 11 is a plan view of the light receiving surface of the photosensitive element of FIG. 10.

FIG. 10 is a schematic view of another embodiment of the present invention. In this drawing, 1 is a focusing screen; S is a range finder area; 2 is pentagonal roof type prism; 3 is an image forming lens; 4 is a photosensitive element; and 8 is a reflection prism. This embodiment exemplifies a bending of the light measuring optical path for the purpose of upper arrangement of the photosensitive element 4. The photosensitive element 4 is positioned at a conjugate point of the image forming lens 3 to the focusing screen 1 as is similar to the example shown in FIG. 8. But, in the embodiment of FIG. 10, the photosensitive element 4 has a light receiving surface of different pattern as shown in FIG. 11 where it is divided into a central portion 41a and an environmental portion 41b surrounding the central portion 41a. By an output from only the central portion 41a, a narrow field of view light measuring of the focusing screen 1 is effected. By both of outputs of the central portion 41a and the environmental portion 41b, a wide field of view light measuring is effected. Thus, the light measuring device of FIGS. 10 and 11 can be operated with selection of the spot-measuring and average-measuring modes. An opaque portion P is provided at the center of the central portion 41a. According to this embodiment, a light measuring device of excellent F-number proportionality with the capability of changing over between different light measuring modes is realized.

Whereas the present invention involves the above-described embodiments, it is readily possible to replace the image forming lens 3 shown in these embodiments by a Fresnel lens or other suitable image forming element, and to alter the position of the image forming lens 3 to another one behind the exit face of the pentagonal roof type prism 2. Further it is also readily possible to vary the form and pattern of the opaque portion and the light receiving surface of the photosensitive element 4 and to increase the number of divided areas of the light receiving surface of FIG. 11.

As has been described above, according to the invention, a valuable improvement of the F-number proportionality is achieved by using a simple means. As a result, many advantages are produced that even when the diaphragm stops down, an accurate light measuring is possible, that the amount of light measured is hardly affected by interchanging the photographic lens, and that as the focusing screen is interchanged, the amount of light measured hardly differs with different range finders. Further, in application to light measuring devices capable of changing over the light measuring area, another advantage is produced that the F-number proportionality is stabilized against change of the light measuring area.

What is claimed is:
1. A single lens reflex camera comprising:
   (a) a photographic system including a photographic lens;
   (b) a viewfinder optically disposed of said photographic system and including a focusing screen having a transparent area surrounded by a light diffusing area, a prism for changing the direction of an optical path, and a lens for observation from the object side;
   (c) a light receiving element positioned off an optical axis of said viewfinder;

(d) converging optical means for converging light from said focusing screen to said light receiving element; and
(e) light blocking means for blocking at least part of an image of said transparent area which is formed by said converging optical means.

2. A camera according to claim 1, wherein said light receiving element is arranged to face at the exit surface of said prism.

3. A camera according to claim 1, wherein said light blocking means is a mask arranged between said light receiving element and said converging optical means.

4. A camera according to claim 3, wherein said mask blocks all the image of said transparent area.

5. A camera according to claim 3, wherein said mask blocks part of said transparent area.

6. A camera according to claim 3, wherein said mask has a semi-transparent characteristic.

7. A camera according to claim 3, wherein said mask is formed by vacuum-depositing an opaque material on the light receiving surface of said light receiving element.

8. A camera according to claim 1, wherein said converging optical means is an image forming lens.

9. A camera according to claim 1, wherein the light receiving surface of said light receiving element is divided into an inside area for measuring light in a narrow field of view, and an outside area for measuring light in a wide field of view.

* * * * *

UNITED STATES PATENT AND TRADEMARK OFFICE
CERTIFICATE OF CORRECTION

PATENT NO. : 4,544,256
DATED : October 1, 1985
INVENTOR(S) : Kikuo Momiyama, et al It is certified that error appears in the above-identified patent and that said Letters Patent is hereby corrected as shown below:

In the heading of the Patent it should read:

--[30] Foreign Application Priority Data

Sept. 8, 1983 [JP]  Japan............58-139451 --

Signed and Sealed this

Twelfth Day of August 1986

[SEAL]

*Attest:*

DONALD J. QUIGG

*Attesting Officer*  *Commissioner of Patents and Trademarks*